US012770889B2

(12) United States Patent
Seki et al.

(10) Patent No.: US 12,770,889 B2
(45) Date of Patent: Oct. 20, 2026

(54) ELECTRODE CATALYST PRODUCTION SYSTEM AND PRODUCTION METHOD

(71) Applicant: N.E. CHEMCAT CORPORATION, Tokyo (JP)

(72) Inventors: Yasuhiro Seki, Tokyo (JP); Akinobu Takenoya, Tokyo (JP); Makoto Nishibettou, Tokyo (JP); Kiyotaka Nagamori, Tokyo (JP); Hiroshi Igarashi, Tokyo (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 872 days.

(21) Appl. No.: 17/796,489

(22) PCT Filed: Mar. 23, 2021

(86) PCT No.: PCT/JP2021/012058

§ 371 (c)(1),
(2) Date: Jul. 29, 2022

(87) PCT Pub. No.: WO2021/193661

PCT Pub. Date: Sep. 30, 2021

(65) Prior Publication Data

US 2023/0216063 A1 Jul. 6, 2023

(30) Foreign Application Priority Data

Mar. 23, 2020 (JP) ................................ 2020-050941

(51) Int. Cl.
*H01M 4/88* (2006.01)
*H01M 4/90* (2006.01)

(52) U.S. Cl.
CPC ....... *H01M 4/8882* (2013.01); *H01M 4/9083* (2013.01)

(58) Field of Classification Search
None
See application file for complete search history.

(56) References Cited

U.S. PATENT DOCUMENTS 5,110,466 A * 5/1992 Tanii .................... B01D 25/215
210/225
2007/0184972 A1 8/2007 Roev
(Continued)

FOREIGN PATENT DOCUMENTS

CN 102343168 A * 2/2012
CN 107261579 10/2017
(Continued)

OTHER PUBLICATIONS

JP2007075679A—Machine Translation (Year: 2007).*
(Continued)

*Primary Examiner* — Miriam Stagg
*Assistant Examiner* — Patrick Marshall Greene
(74) *Attorney, Agent, or Firm* — DUANE MORRIS LLP; Gregory M. Lefkowitz; Brandon A. Chan

(57) ABSTRACT

A washing device includes executors for executing a normal washing step and a reverse washing step before executing a plate opening step and a cake peeling step. The normal washing step is a step for supplying a washing water to a filter chamber, allowing the washing water to pass through a cake, and then discharging the washing water from filtrate discharge outlets. The reverse washing step is a step for supplying a washing water from the filtrate discharge outlet (s) to the filter chamber, allowing the washing water to pass through the cake, and then discharging the washing water from the filtrate discharge outlet(s) which are different from the filtrate discharge outlet(s) from which the washing water is supplied. The thickness of the electrode catalyst precursor-containing cake at the time of the injection step is
(Continued)

adjusted to that of a range that has been previously and experimentally determined.

10 Claims, 10 Drawing Sheets

(56) References Cited

U.S. PATENT DOCUMENTS

| | | | |
|---|---|---|---|
| 2008/0112880 A1 | 5/2008 | Kayama | |
| 2013/0253248 A1 | 9/2013 | Gamoras | |
| 2016/0226078 A1 | 8/2016 | Mizusaki | |
| 2019/0299192 A1 | 10/2019 | Gu | |
| 2019/0301991 A1* | 10/2019 | Zhao | G01N 5/045 |
| 2021/0354058 A1 | 11/2021 | Jiang et al. | |
| 2022/0018033 A1* | 1/2022 | Bonduelle-Skrzypczak | H01M 8/0656 |

FOREIGN PATENT DOCUMENTS

| | | | |
|---|---|---|---|
| CN | 209848415 U * | 12/2019 | |
| EP | 2002873 A1 * | 12/2008 | B01D 25/164 |
| JP | H0935723 | 2/1997 | |
| JP | 2007-075679 | 3/2007 | |
| JP | 5327000 | 10/2013 | |
| JP | 5950207 | 7/2016 | |
| JP | 6113902 | 4/2017 | |
| JP | 2019010641 | 1/2019 | |
| JP | 2020-082028 | 6/2020 | |
| KR | 10-1815779 | 1/2018 | |
| KR | 20190139550 A * | 12/2019 | |

OTHER PUBLICATIONS

KR20190139550A—Machine Translation (Year: 2019).*
CN-102343168-A—Machine Translation (Year: 2012).*
CN-209848415-U—Machine Translation (Year: 2019).*
EP-2002873-A1—Machine Translation (Year: 2008).*
LEEKOON's BLOG (Apr. 4, 2018) Blog.Naver.com "Tower Filter Press Filtration Process (Filter Plate Structure)," Korea Filter Engineering https://blog.naver.com/leekkoon/221245134474.

* cited by examiner

ELECTRODE CATALYST PRODUCTION SYSTEM AND PRODUCTION METHOD

CROSS-REFERENCE TO RELATED APPLICATIONS

This application is a § 371 national stage entry of International Application No. PCT/JP2021/012058, filed on Mar. 23, 2021, which claims priority to Japanese Patent Application No. 2020-050941, filed on Mar. 23, 2020, the entire contents of which are incorporated herein by reference.

TECHNICAL FIELD

The present invention relates to an electrode catalyst production system and production method.

BACKGROUND ART

The operating temperature of a so-called polymer electrolyte fuel cell (Polymer Electrolyte Fuel Cell: referred to as "PEFC" hereunder if necessary) is about room temperature to 80° C. Further, a PEFC can be made lighter in weight because inexpensive commodity plastics or the like may be employed as a material(s) compositing the fuel cell main body. Furthermore, a PEFC can have its solid polymer electrolyte membrane made thinner so that the electric resistance can be lowered whereby a loss in power generation can be reduced relatively easily. In this way, since a PEFC has many advantages, it can be applied to fuel-cell automobiles, cogeneration systems for household use and the like.

As an electrode catalyst for a PEFC, there is known, for example, an electrode catalyst with platinum (Pt) or a platinum (Pt) alloy as an electrode catalyst component being supported on carbon as a support. When using such electrode catalyst as an electrode catalyst for a fuel cell, if the electrode catalyst contains a large amount of impurities derived from the raw materials thereof and/or impurities mixed thereinto from a production facility thereof, there may not be achieved a satisfactory catalytic activity, and corrosion of the catalytic layer may occur such that the life of the fuel cell may be shortened. Thus, it is preferred that the impurity content in the electrode catalyst be kept low. Here, examples of the impurities include chemical species belonging to the halogens (e.g. ions and salts thereof), and organic matters (organic acids, salts thereof, and condensates of organic acids).

For example, for the purpose of keeping a halogen content, particularly a chlorine content of the electrode catalyst low, there may be performed a step of eliminating chlorine after producing an electrode catalyst precursor as a raw material of the electrode catalyst. For example, the disclosure in Patent document 1 is such that a second catalyst metal precursor solution is to be mixed with a first catalyst metal precursor mixture and a carbon-based support mixture, followed by adjusting pH, repeating a heating and cooling procedure, washing a catalyst thus obtained with a centrifugal separator 3 to 4 times, and then drying the same with a freeze drier. Further, in Patent documents 2 and 3, as a wet dechlorination method for an ultrafine particulate titanium dioxide that can be utilized in a fuel cell catalyst, there is listed a method where titanium dioxide is to be suspended in water, and chlorine that has transferred to liquid phase is then separated from the system by filter press.

PRIOR ART DOCUMENTS

Patent Documents

Patent document 1: JP-A-2007-214130
Patent document 2: JP-A-2006-265094
Patent document 3: JP-A-2011-57552

SUMMARY OF THE INVENTION

Problems to be Solved by the Invention

As is the case in Patent document 1, if using a centrifugal separator to wash an electrode catalyst precursor, the electrode catalyst precursor will adhere to the inner wall of the chamber in the centrifugal separator due to the centrifugal force, so that an operator will have to manually scratch off the adhering electrode catalyst.

Further, for example, in order to sufficiently eliminate the chlorine component contained in an electrode catalyst precursor, washing and filtration by water has to be repeated; for example, it may take at least 2 to 4 days to wash and filtrate 10 to 50 kg of a catalyst with one centrifuge. In this way, washing by a centrifugal separator takes time and effort, and has thus presented a problem of being inefficient.

Further, in Patent documents 2 and 3, although filter press is used for dechlorination of a fuel cell catalyst, there are no specific descriptions on for example a specific configuration and steps of a device for carrying out filter press, as well as conditions for washing and filtration steps.

The present invention was made in view of these circumstances, and is to provide an electrode catalyst production system and production method capable of drastically reducing the time and effort to produce an electrode catalyst, by omitting the operation for an operator to scratch off an electrode catalyst precursor, and by shortening the washing time of the electrode catalyst precursor

Means to Solve the Problems

In order to solve such problem(s), the present invention provides an electrode catalyst production system for producing an electrode catalyst. The system includes:

- an electrode catalyst precursor production device for producing an electrode catalyst precursor as a raw material of an electrode catalyst containing an electrically conductive support and a catalyst particle supported on the electrically conductive support;
- a washing device for washing the electrode catalyst precursor by filter press; and
- a drying device for drying the washed electrode catalyst precursor that has been washed by the washing device, wherein the washing device has executors for executing:

- a plate closing step for forming a filter chamber by clamping together filter plates;
- an injection step for injecting a liquid containing the electrode catalyst precursor into the filter chamber from a stock liquid supply tube so as to filtrate the liquid, and then discharging a filtrate from filtrate discharge outlets;
- a normal washing step for supplying a washing water from the stock liquid supply tube to the filter chamber, allowing the washing water to pass through a cake containing the electrode catalyst precursor, and then discharging the washing water from the filtrate discharge outlets;

a reverse washing step for supplying a washing water from one or more of the filtrate discharge outlets to the filter chamber, allowing the washing water to pass through the cake containing the electrode catalyst precursor, and then discharging the washing water from one or more of the filtrate discharge outlets which are different from the filtrate discharge outlet (s) from which the washing water is supplied;

a plate opening step for opening the filter plates forming the filter chamber; and a cake peeling step for bringing down a filter cloth so as to peel and drop the cake containing the electrode catalyst precursor, and wherein in the injection step, the cake is formed in such a manner that a thickness thereof falls into a range that has been previously and experimentally determined in consideration of a washing degree and a washing time that are required for the electrode catalyst precursor used.

In the case of the aforesaid electrode catalyst production system, when the electrically conductive support is a conductive carbon, the thickness of the cake containing the electrode catalyst precursor may be 5 to 10 mm at the time of the injection step.

In the case of the aforesaid electrode catalyst production system, the washing device may further have an executor for executing a filter cloth washing step for washing the filter cloth with a washing water after the cake peeling step.

In the case of the aforesaid electrode catalyst production system, a washing time in the reverse washing step and a washing time in the normal washing step may be of similar length.

Further, the present invention provides an electrode catalyst production method for producing an electrode catalyst. The method includes:

an electrode catalyst precursor producing step for producing an electrode catalyst precursor as a raw material of an electrode catalyst containing an electrically conductive support and a catalyst particle supported on the electrically conductive support;

a washing step for washing the electrode catalyst precursor by filter press; and a drying step for drying the washed electrode catalyst precursor that has been washed in the washing step, wherein the washing step includes:

a plate closing step for forming a filter chamber by clamping together filter plates;

an injection step for injecting a liquid containing the electrode catalyst precursor into the filter chamber from a stock liquid supply tube so as to filtrate the liquid, and then discharging a filtrate from filtrate discharge outlets;

a normal washing step for supplying a washing water from the stock liquid supply tube to the filter chamber, allowing the washing water to pass through a cake containing the electrode catalyst precursor, and then discharging the washing water from the filtrate discharge outlets;

a reverse washing step for supplying a washing water from one or more of the filtrate discharge outlets to the filter chamber, allowing the washing water to pass through the cake containing the electrode catalyst precursor, and then discharging the washing water from one or more of the filtrate discharge outlets which are different from the filtrate discharge outlet (s) from which the washing water is supplied;

a plate opening step for opening the filter plates forming the filter chamber; and a cake peeling step for bringing down a filter cloth so as to peel and drop the cake containing the electrode catalyst precursor, and wherein in the injection step, the cake is formed in such a manner that a thickness thereof falls into a range that has been previously and experimentally determined in consideration of a washing degree and a washing time that are required for the electrode catalyst precursor used.

In the case of the aforesaid electrode catalyst production method, when the electrically conductive support is a conductive carbon, the thickness of the cake containing the electrode catalyst precursor may be 5 to 10 mm at the time of the injection step.

In the case of the aforesaid electrode catalyst production method, the washing step may further have a filter cloth washing step for washing the filter cloth with a washing water after the cake peeling step.

In the case of the aforesaid electrode catalyst production method, a washing time in the reverse washing step and a washing time in the normal washing step may be of similar length.

Effects of the Invention

In the case of the electrode catalyst production system and production method of the present invention, the operation for an operator to scratch off the electrode catalyst precursor can be omitted, and the washing time of the electrode catalyst precursor can be shortened, thus making it possible to drastically reduce the time and effort for producing an electrode catalyst having a low halogen content, particularly a low chlorine content.

MODE FOR CARRYING OUT THE INVENTION

With reference to the drawings, described hereunder are preferable embodiments of the electrode catalyst production system and production method of the present invention.

<Electrode Catalyst Production System>

Figure 1:
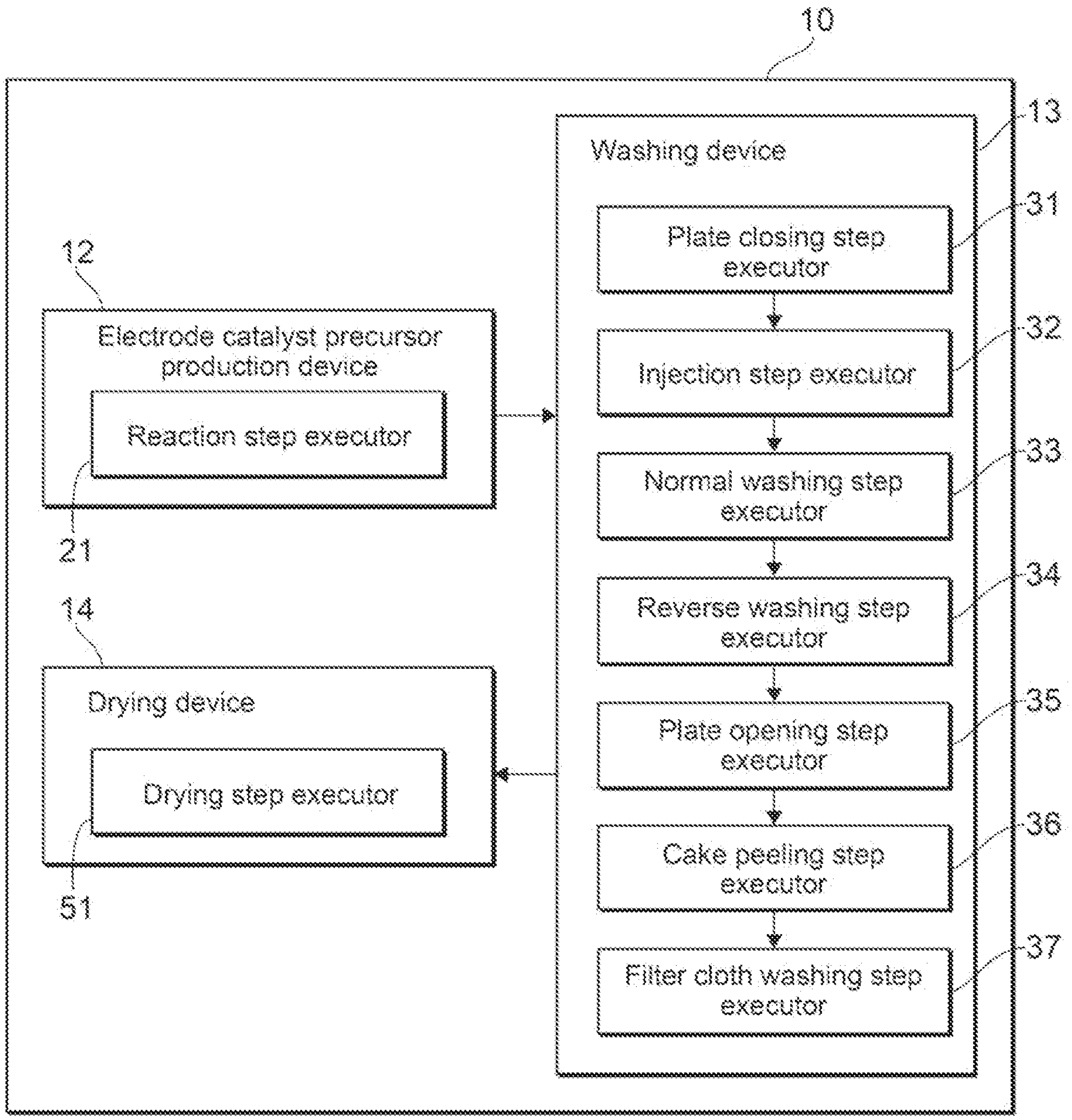
FIG. 1 is a block diagram showing a preferable embodiment of the electrode catalyst production system of the present invention.

FIG. 1 is a block diagram showing an outline of an electrode catalyst production system 10 of the present embodiment. The electrode catalyst production system 10 has an electrode catalyst precursor production device 12 for producing an electrode catalyst precursor as a raw material of an electrode catalyst 1 (see FIG. 11); a washing device 13 for washing the electrode catalyst precursor by filter press; and a drying device 14 for drying the washed electrode catalyst precursor 41 (see FIG. 15) that has been washed by the washing device 13.

(Electrode Catalyst Precursor Production Device)

The electrode catalyst precursor production device 12 is to produce the electrode catalyst precursor as the raw material of the electrode catalyst 1. The electrode catalyst precursor production device 12 includes a reaction step executor 21 for executing a reaction step for producing the electrode catalyst precursor. In the reaction step, the electrode catalyst precursor as the raw material of the electrode catalyst 1 is produced by supporting catalyst components (core part 4, shell part 5) of the electrode catalyst 1 on a support 2 (see FIG. 11). There are no particular restrictions on the production method of the electrode catalyst precursor so long as the method is capable of supporting the catalyst components of the electrode catalyst 1 on the support 2. For example, there may be listed production methods employing, for example, an impregnation method where a solution containing the catalyst components of the electrode catalyst 1 is brought into contact with the support 2 so as to impregnate the support 2 with the catalyst components; a liquid phase reduction method performed by putting a reductant into a solution containing the catalyst components of the electrode catalyst 1; an electrochemical deposition method such as an underpotential deposition (UPD) method; a chemical reduction method; a reductive deposition method effected by an adsorbed hydrogen; a surface leaching method involving an alloy catalyst; an immersion plating method; a sputtering method; and a vacuum deposition method.

(Washing Device)

The washing device 13 is to wash the electrode catalyst precursor produced by the electrode catalyst precursor production device 12 via filter press. At such washing device 13, not only the washing of the electrode catalyst precursor is carried out, but filtration and dewatering are also carried out as well.

Figure 2:
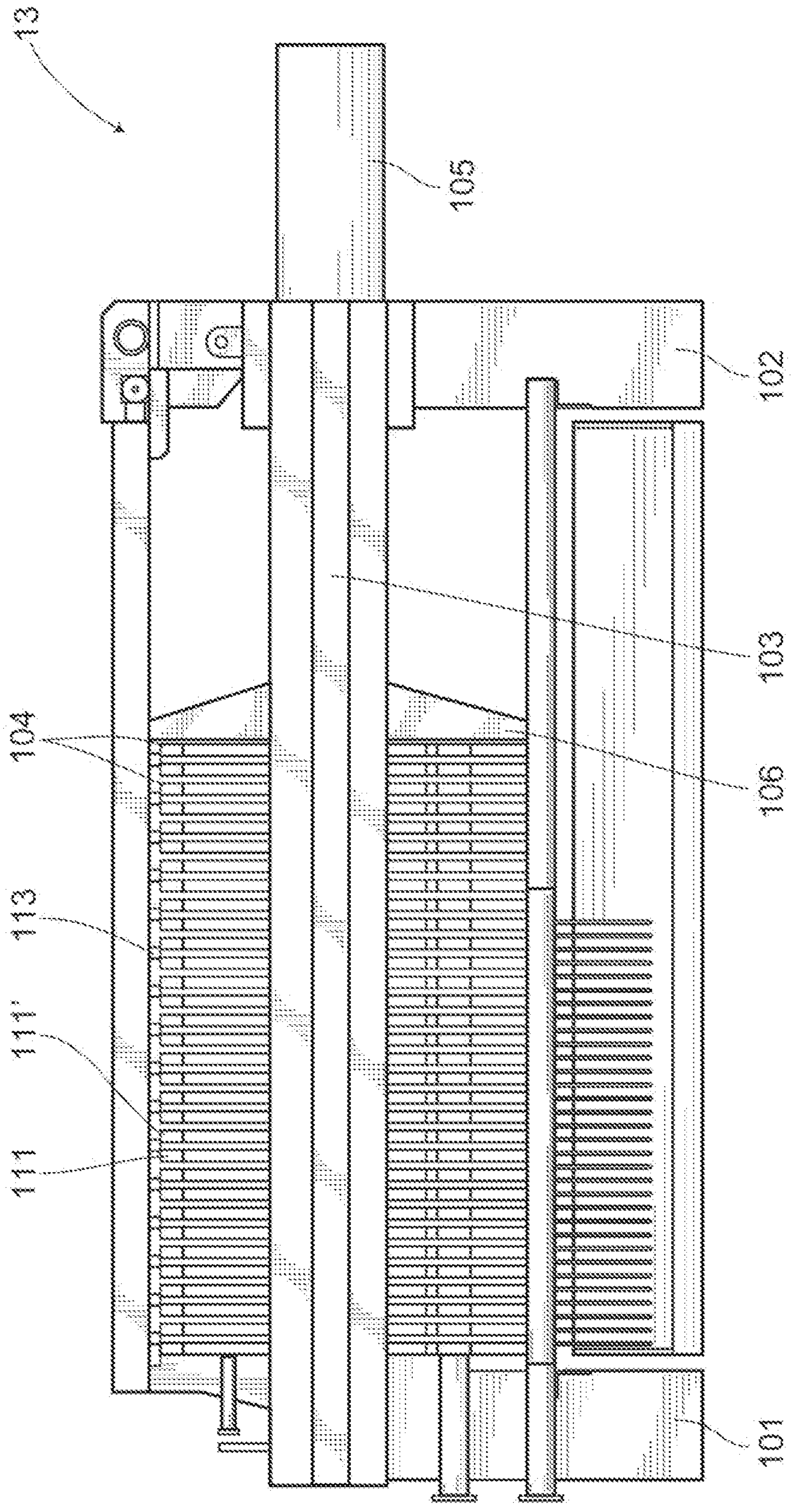
FIG. 2 is a side view showing a preferable embodiment of a washing device for use in the electrode catalyst production system and production method of the present invention.

FIG. 2 shows an example of the washing device 13 for performing filter press. The washing device 13 shown in this drawing is such that a plurality of dewatering devices 104 are horizontally aligned in parallel on a guide rail 103 bridged between a front frame 101 and a rear frame 102. These dewatering devices 104 are supported in a manner such that they are capable of moving on the guide rail 103 along the horizontal direction. An electric cylinder 105 may for example be supported at the rear frame 102 so that the dewatering devices 104 will be clamped by a pressing member 106 reciprocating due to a driving force of the electric cylinder 105. Such filter-press washing device 13 is conventionally known, and there is known a one disclosed in, for example, Japanese Patent No. 5950207. Particularly, as for the dewatering device 104, there is known a one disclosed in, for example, Japanese Patent No. 5327000.

An outline of a flow for performing washing by filter press is described (see FIG. 3 to FIG. 10). At first, by supplying a stock liquid 30 to a filter chamber 112 formed between filter plates 111, 111' that are closed, the stock liquid 30 will pass through a filter cloth 113 and thus be filtrated, whereby a filtrate 42 will then be discharged to the outside. A solid matter captured by the filer cloth 113 will be dewatered while forming a cake layer. After dewatering is over, the electric cylinder 105 will be contracted to open the plurality of the filter plates 111, 111' all together, and at the same time discharge a dewatered cake 40 while allowing the filter cloth 113 to travel downward.

Figure 16:
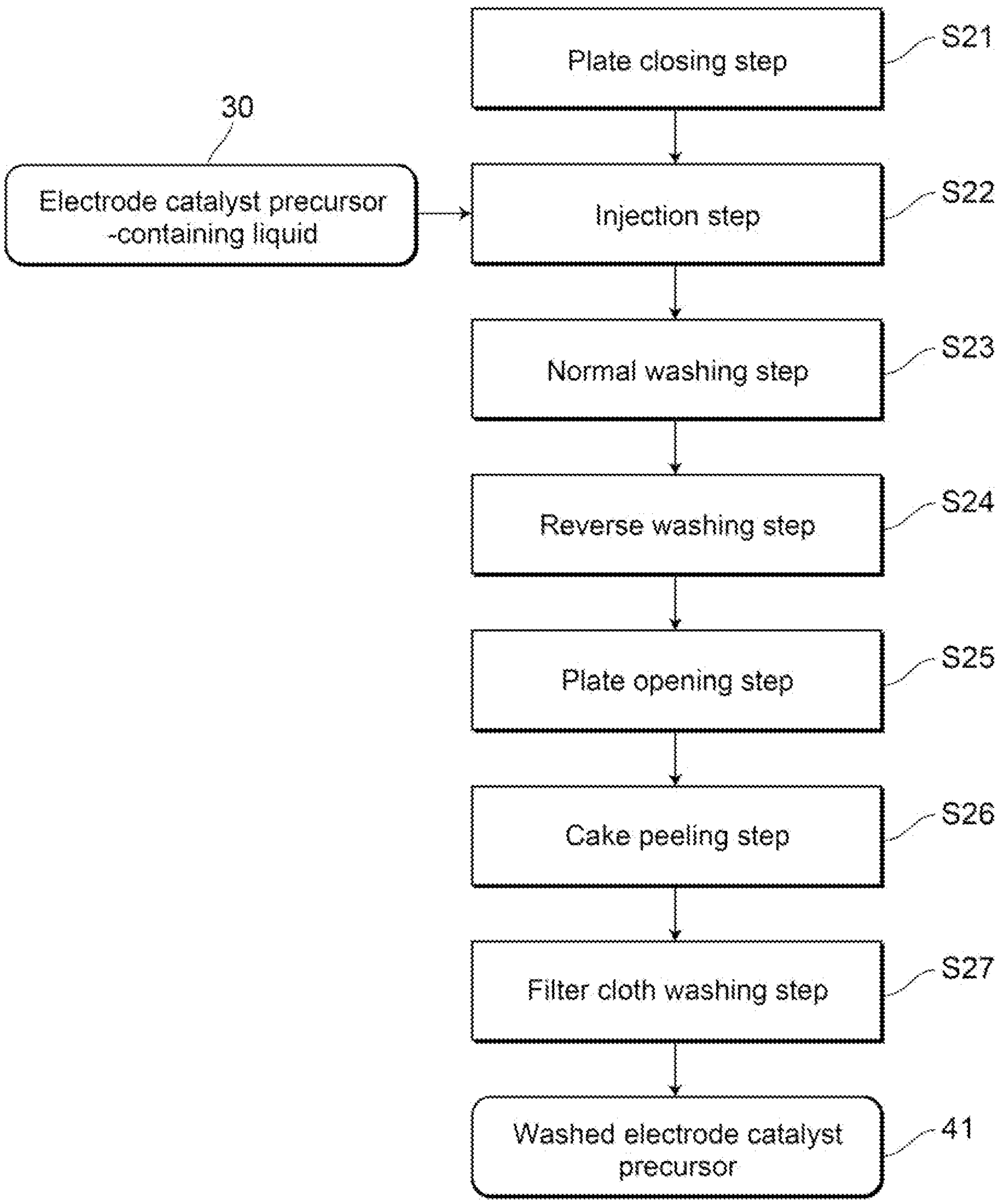
FIG. 16 is a flow chart showing a preferable embodiment of a flow of a washing step in the electrode catalyst production method of the present invention.

As shown in the block diagram of FIG. 1, the washing device 13 includes a plate closing step executor 31, an injection step executor 32, a normal washing step executor 33, a reverse washing step executor 34, a plate opening step executor 35, a cake peeling step executor 36 and a filter cloth washing step executor 37 as executors for respectively executing a plate closing step, an injection step, a normal washing step, a reverse washing step, a plate opening step, a cake peeling step and a filter cloth washing step. Described hereunder are the structures of the steps S21 to S27 that are also shown in a flow diagram of a later-described FIG. 16 illustrating the production method of the electrode catalyst 1.

[Plate Closing Step]

Figure 3:
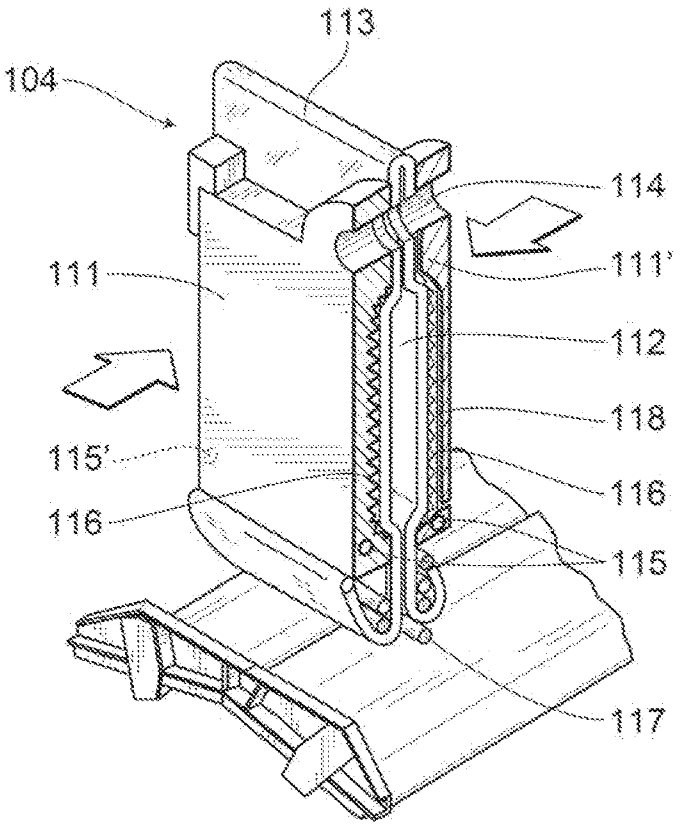
FIG. 3 is a perspective view showing a preferable embodiment of an operational state of a dewatering device in a plate closing step of the electrode catalyst production system and production method of the present invention.

The plate closing step S21 is a step for forming the filter chamber 112 by clamping together the filter plates 111, 111', and is executed by the plate closing step executor 31. FIG. 3 is a drawing showing one dewatering device 104 taken out of the washing device 13 shown in FIG. 2, and illustrates a preferable embodiment of an operational state in the plate closing step S21. The plate closing step executor 31 is such that by driving the electric cylinder 105 so as to move the pressing member 106 toward the front frame 101, the two filter plates 111, 111' of each dewatering device 104 will be brought close and then clamped together to form the filter chamber 112.

[Injection Step]

Figure 4:
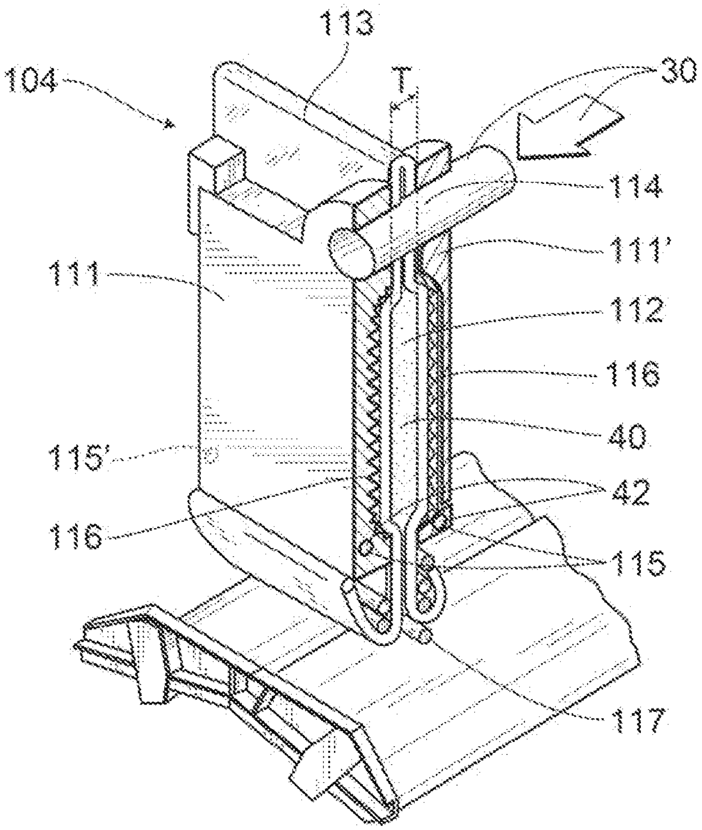
FIG. 4 is a perspective view showing a preferable embodiment of an operational state of the dewatering device in an injection step of the electrode catalyst production system and production method of the present invention.

The injection step S22 is a step for injecting the electrode catalyst precursor-containing liquid (stock liquid) 30 into the filter chamber 112 from a stock liquid supply tube 114 so as to filtrate the liquid, and then discharging the filtrate 42 from filtrate discharge outlets 115, 115'; the injection step S22 is executed by the injection step executor 32. FIG. 4 is a drawing showing one dewatering device 104 taken out of the washing device 13 shown in FIG. 2, and illustrates a preferable embodiment of an operational state in the injection step S22. By means of the injection step executor 32, once the electrode catalyst precursor-containing liquid 30 has been injected into the filter chamber 112 from the stock liquid supply tube 114, the water content of the electrode catalyst precursor-containing liquid 30 shall ooze into a filter bed 116 through the filter cloth 113 and then be discharged to the outside from the filtrate discharge outlets 115, 115'. In this way, the electrode catalyst precursor-containing liquid 30 injected into the filter chamber 112 is filtrated. That is, while the solid content in the electrode catalyst precursor-containing liquid 30 will remain in the filter chamber 112 as an electrode catalyst precursor-containing cake 40, the water content of the electrode catalyst precursor-containing liquid 30 will be discharged to the outside as the filtrate 42.

Further, in this injection step S22, the electrode catalyst precursor-containing cake 40 is formed in such a manner that the thickness thereof falls into a range that has been experimentally determined in advance. The thickness of the cake 40 is previously and experimentally determined in consideration of a washing degree and a washing time that are required for the electrode catalyst precursor used.

Here, if the electrode catalyst used employs a conductive carbon as its support, it is preferred that a thickness T of the cake 40 at the time of the injection step S22 be adjusted to 5 to 10 mm. When the thickness T of the cake 40 is not larger than 10 mm, there can be relatively easily achieved a sufficient washing effect by adjusting a washing time in the later-described normal washing step and/or reverse washing step. When the thickness T of the cake 40 is larger than 10 mm, there will be observed a greater tendency where a sufficient washing effect cannot be achieved even by extending the washing time in the later-described normal washing step and/or reverse washing step.

Further, when the thickness T of the cake 40 is not smaller than 5 mm, cracks are unlikely to be formed in the cake, and there will thus be observed a greater tendency for preventing the formation of a path(s) through which a washing water passes by without passing through the cake when flowing from a surface of the cake on the upstream side toward a surface thereof on the downstream side.

[Normal Washing Step]

Figure 5:
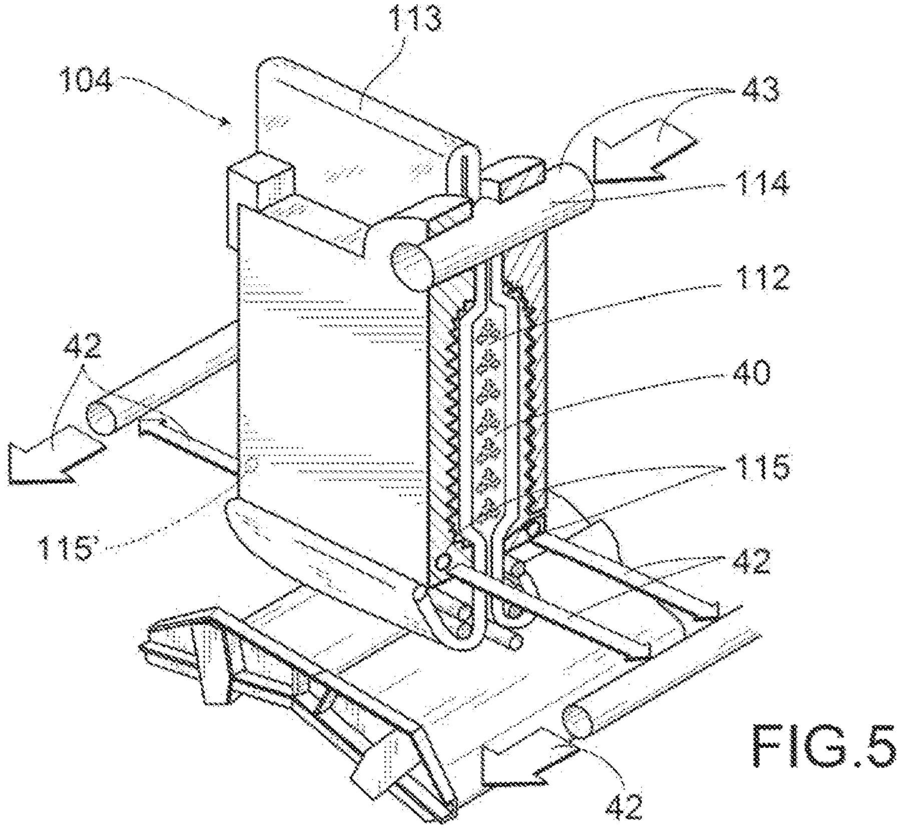
FIG. 5 is a perspective view showing a preferable embodiment of an operational state of the dewatering device in a normal washing step of the electrode catalyst production system and production method of the present invention.

The normal washing step S23 is a step for supplying a washing water 43 from the stock liquid supply tube 114 to the filter chamber 112, allowing the washing water 43 to pass through the electrode catalyst precursor-containing cake 40, and then discharging the washing water 43 from the filtrate discharge outlets 115, 115'; the normal washing step S23 is executed by the normal washing step executor 33. FIG. 5 is a drawing showing one dewatering device 104 taken out of the washing device 13 shown in FIG. 2, and illustrates a preferable embodiment of an operational state in the normal washing step S23. By means of the normal washing step executor 33, the washing water 43 will be flowed from the stock liquid supply tube 114 toward the filtrate discharge outlets 115, 115', thereby washing the electrode catalyst precursor-containing cake 40 remaining in the filter chamber 112 as a result of the injection step S22. In this way, an electric conductivity $\rho$ of the filtrate that is measured by a JIS-standard testing method (JIS K0522) can be lowered, and a halogen content, particularly a chlorine content in the electrode catalyst precursor can be reduced.

In the normal washing step S23, while performing washing, it is preferred that the temperature of the washing water 43 be switched at the moment when the electric conductivity $\rho$ of the filtrate has reached a value that is as large as or smaller than a given value. For example, at the moment when the electric conductivity $\rho$ of the filtrate has reached a value that is as large as or smaller than the given value, the washing water 43 may be switched from a normal temperature water (e.g. 23° C.) to a heated water (e.g. 70° C.). It is preferred that the given value of the electric conductivity $\rho$ of the filtrate be a value selected from a range of 20 to 40 μS/cm. The temperature of the normal temperature water is preferably 20 to 25° C. The temperature of the heated water is preferably 60 to 80° C.

[Reverse Washing Step]

Figure 6:
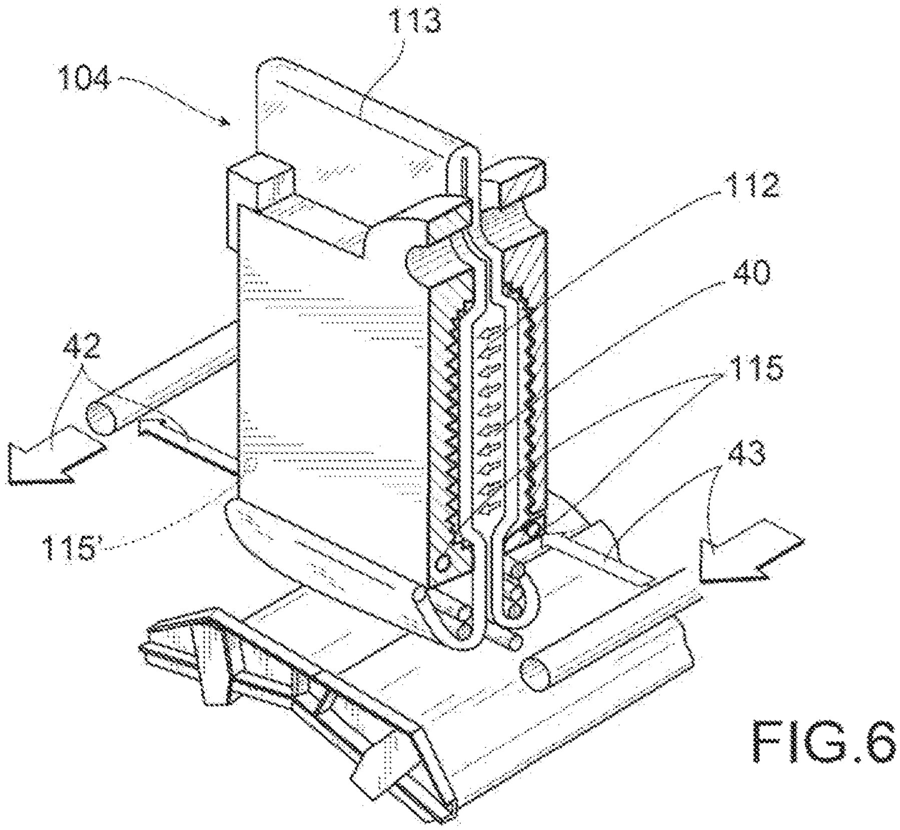
FIG. 6 is a perspective view showing a preferable embodiment of an operational state of the dewatering device in a reverse washing step of the electrode catalyst production system and production method of the present invention.

The reverse washing step S24 is a step for supplying the washing water 43 from the filtrate discharge outlet(s) 115 to the filter chamber 112, allowing the washing water 43 to pass through the electrode catalyst precursor-containing cake 40, and then discharging the washing water 43 from the filtrate discharge outlet(s) 115' which are different from the filtrate discharge outlet(s) 115 from which the washing water 43 is supplied; the reverse washing step S24 is executed by the reverse washing step executor 34. FIG. 6 is a drawing showing one dewatering device 104 taken out of the washing device 13 shown in FIG. 2, and illustrates a preferable embodiment of an operational state in the reverse washing step S24. The dewatering device 104 has for example at least two filtrate discharge outlets 115, 115'. Contrary to the normal washing step S23, by means of the reverse washing step executor 34, by flowing the washing water 43 from the filtrate discharge outlet(s) 115 toward the filter chamber 112, the electrode catalyst precursor-containing cake 40 remaining in the filter chamber 112 can be washed. The filtrate 42 is for example discharged from the filtrate discharge outlet(s) 115' which are different from the filtrate discharge outlet(s) 115 from which the washing water 43 is supplied. By performing the reverse washing step S24, the electric conductivity $\rho$ of the filtrate can be further lowered, and the halogen content, particularly the chlorine content in the electrode catalyst precursor can be further reduced.

In the reverse washing step S24, while washing can be performed with a normal temperature water (e.g. 23° C.), it is preferred that washing be performed with a heated water (e.g. 70° C.) from the very start since the electric conductivity $\rho$ of the filtrate will have already decreased to a certain extent at the end of the normal washing step S23. The temperature of the heated water is preferably 60 to 80° C.

[Plate Opening Step]

Figure 7:
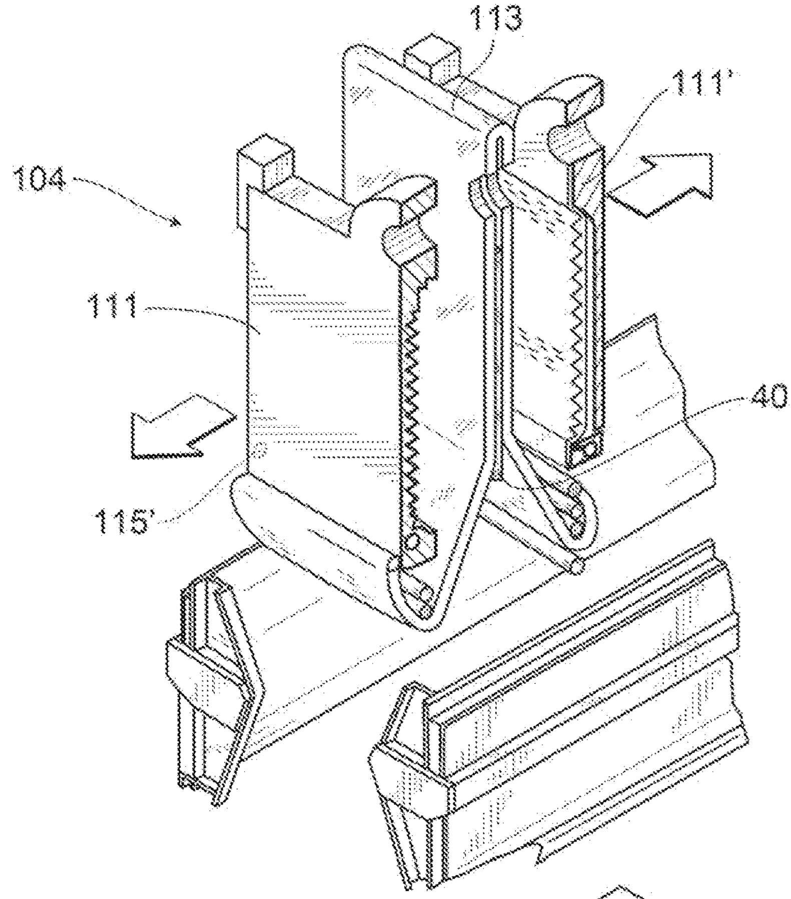
FIG. 7 is a perspective view showing a preferable embodiment of an operational state of the dewatering device in a plate opening step of the electrode catalyst production system and production method of the present invention.

The plate opening step S25 is a step for opening the filter plates 111, 111' forming the filter chamber 112, and is executed by the plate opening step executor 35. FIG. 7 is a drawing showing one dewatering device 104 taken out of the washing device 13 shown in FIG. 2, and illustrates a preferable embodiment of an operational state in the plate opening step S25. The plate opening step executor 35 is such that by driving the electric cylinder 105 so as to move the pressing member 106 toward the rear frame 102, the clamping of the dewatering devices 104 will be unlocked. In this way, the two filter plates 111, 111' of each dewatering device 104 will move apart from each other so that the filter chamber 112 will be opened.

[Cake Peeling Step]

Figure 8:
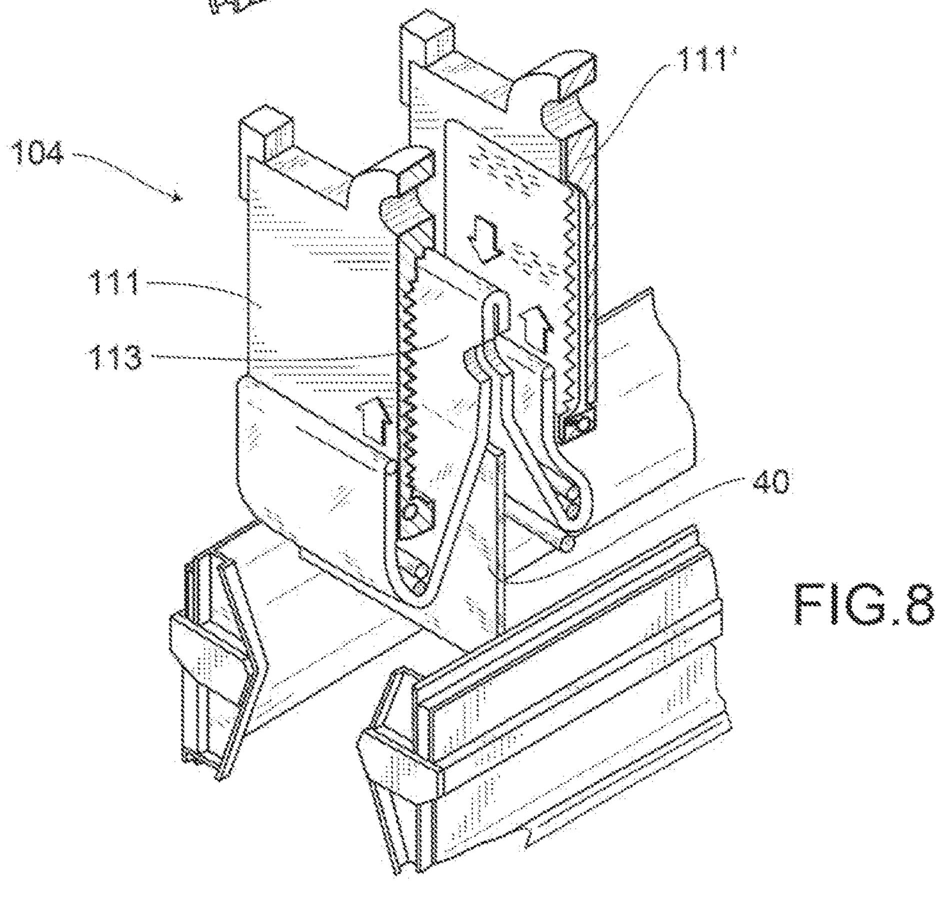
FIG. 8 is a perspective view showing a preferable embodiment of an operational state of the dewatering device in a cake peeling step of the electrode catalyst production system and production method of the present invention.

The cake peeling step S26 is a step for bringing down the filter cloth so as to peel and drop the electrode catalyst precursor-containing cake 40 that has been dewatered; the cake peeling step S26 is executed by the cake peeling step executor 36. FIG. 8 is a drawing showing one dewatering device 104 taken out of the washing device 13 shown in FIG. 2, and illustrates a preferable embodiment of an operational state in the cake peeling step S26. By means of the cake peeling step executor 36, once the two filter plates 111, 111' of the dewatering device 104 have moved apart from each other by a given distance, the filter cloth 113 holding the electrode catalyst precursor-containing cake 40 will travel downward. Thus, the electrode catalyst precursor-containing cake 40 will be automatically peeled from the filter cloth 113. Here, the amount of water contained in the cake 40 (water amount) is a value obtained by dividing the weight of water contained in the cake 40 by a sum of the weight of a catalyst powder contained in the cake 40 and the weight of water contained therein; the water content ratio of the cake 40 at that time is preferably 60 to 80 wt %.

[Filter Cloth Washing Step]

Figure 9:
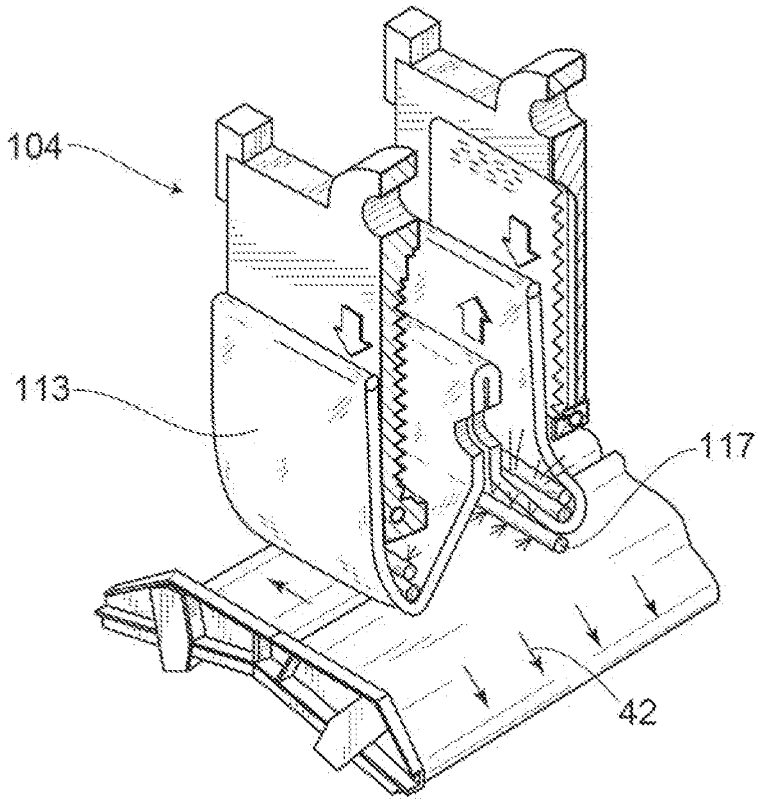
FIG. 9 is a perspective view showing a preferable embodiment of an operational state of the dewatering device in a filter cloth washing step of the electrode catalyst production system and production method of the present invention.

The filter cloth washing step S27 is a step for washing the filter cloth 113 with the washing water 43 after the cake peeling step S26, and is executed by the filter cloth washing step executor 37. FIG. 9 is a drawing showing one dewatering device 104 taken out of the washing device 13 shown in FIG. 2, and illustrates a preferable embodiment of an operational state in the filter cloth washing step S27. After the electrode catalyst precursor-containing cake 40 has been peeled from the filter cloth 113, the filter cloth 113 will travel upward and return to its original position. By means of the filter cloth washing step executor 37, while the filter cloth 113 is travelling upward, the washing water 43 will be supplied from a washing water tube 117 provided in a lower region of the dewatering device 104, using a filter cloth-washing pump (not shown). By spraying such washing water 43 onto the filter cloth 113, the filter cloth 113 will be washed for the sake of clogging prevention of the filter cloth 113, and the electrode catalyst precursor or the like that has adhered to the filter cloth 113 will be reliably collected. That is, since a discharged water at the time of washing the filter cloth contains the electrode catalyst precursor, it is preferred that the electrode catalyst precursor be all collected. In this way, by flushing so as to collect the electrode catalyst precursor that has adhered to the filter cloth 113, a yield of the electrode catalyst precursor can be improved. Moreover, by for example washing the filter cloth 113 while repeatedly having the same travel upward and downward, the amount of the electrode catalyst precursor collected can be further improved.

[Compression Step]

Figure 10:
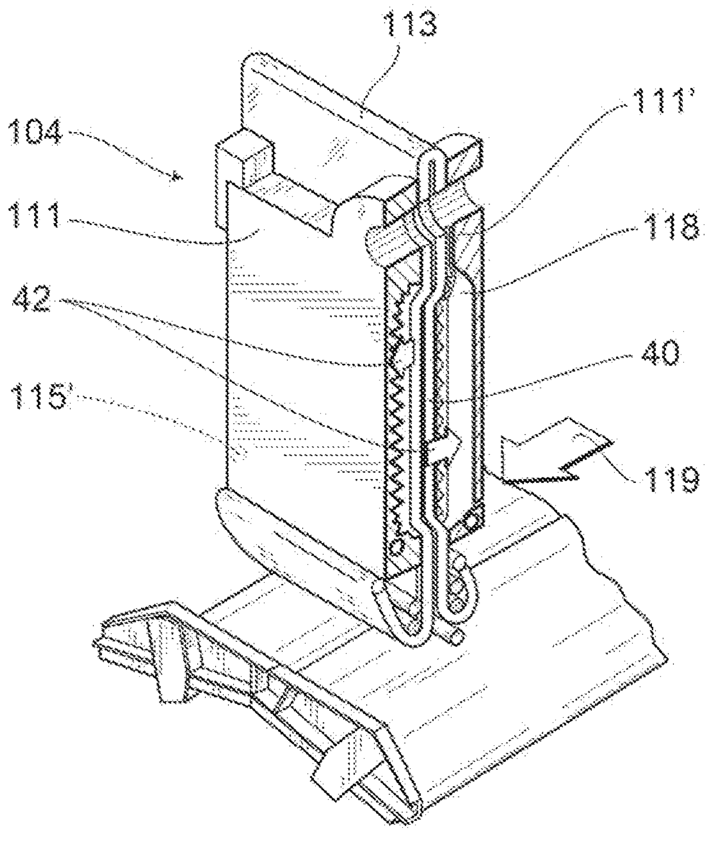
FIG. 10 is a perspective view showing a preferable embodiment of an operational state of the dewatering device in a compression step of the electrode catalyst production system and production method of the present invention.

Here, a compression step may be performed after the normal washing step S23 and/or after the reverse washing step S24. The compression step is a step for further compressing and dewatering the electrode catalyst precursor-containing cake 40, and is executed by a compression step executor (not shown). FIG. 10 is a drawing showing one dewatering device 104 taken out of the washing device 13 shown in FIG. 2, and illustrates a preferable embodiment of an operational state in the compression step. By means of the compression step executor, by injecting a pressurized water 119 into a diaphragm 118 provided at the one filter plate 111', the electrode catalyst precursor-containing cake 40 can be further compressed and dewatered. By means of the compression step, a solid content concentration of the electrode catalyst precursor-containing cake 40 will increase such that there can be produced an electrode catalyst precursor-containing cake 40 having an extremely low water content ratio.

Here, it is preferable to employ a configuration where the pressurized water 119 is to be drawn from the diaphragm 118 after the compression step is over, because there will be no more pressing by the diaphragm 118, and the filter cloth 113 being pressed by the diaphragm 118 can thus be easily peeled from the cake 40.

Moreover, in this compression step, there may be employed a configuration where a diaphragm (not shown) is also provided at the other filter plate 111. In such case, the pressurized water will also be injected into the diaphragm (not shown) provided on the filter plate 111 side, whereby the electrode catalyst precursor-containing cake 40 can then be compressed and dewatered. Even in this case, it is preferable to employ a configuration where the pressurized water is to be drawn from the diaphragm after the compression step is over, because there will be no more pressing by the diaphragm (not shown), and the filter cloth 113 being pressed by the diaphragm (not shown) can thus be easily peeled from the cake 40.

In the above descriptions, one dewatering device 104 is described; in the case of the washing device 13 shown in FIG. 2, since all the dewatering devices 104 are capable of operating in an identical manner, a quantity to be treated at one time with one device can be increased such that the production efficiency of the electrode catalyst can be improved. Further, since the dewatering device(s) 104 described above has a large filtration area and employs a high pressure-resisting structure, a treatment speed can be improved. Furthermore, since the introduction of the stock liquid, the discharge of the cake and then the washing of the device can all be carried out in a fully automatic manner, the time and effort spent in treatment in the washing step can be saved. In addition, since a resin material, a lining material or the like may be selected as a material of the device, the device will be able to have a high corrosion resistance.

[Electric Conductivity ρ of Filtrate]

Treatment conditions such as a normal washing time in the normal washing step S23 and a reverse washing time in the reverse washing step S24 are adjusted such that the electric conductivity ρ of the filtrate obtained after the normal washing step S23 and/or after the reverse washing step S24 will be as large as or smaller than a predetermined value when measured by the JIS-standard testing method (JIS K0522). For example, the washing effect is enhanced if the washing time in the reverse washing step and the washing time in the normal washing step are of similar length. “Similar” refers to a notion that there may be a difference of 0 to 15 min (an absolute value of a difference between the washing time in the normal washing step and the washing time in the reverse washing step). Further, the filtrate is the liquid discharged from the filtrate discharge outlet(s) after performing washing, and it is preferred that there be used all the filtrates discharged in such step.

The predetermined value of the electric conductivity ρ of the filtrate obtained after the normal washing step S23 is preferably a value selected from a range of not larger than 20 μS/cm. The predetermined value of the electric conductivity ρ of the filtrate obtained after the reverse washing step S24 is preferably a value selected from a range of not larger than 10 μS/cm. When the electric conductivity ρ of the filtrate is not larger than 10 μS/cm, the concentration of the chlorine (Cl) and bromine (Br) species contained in the electrode catalyst precursor shall be reduced to such a degree that the electrode catalyst can be put to practical use as an electrode catalyst for use in a fuel cell.

As the washing water 43 used in the washing device 13, while a pure water such as an ultrapure water may be used, it does not necessarily have to be a pure water. For example, there may be used an ion-exchange water or the like having a pH of 6 to 8 and an electric conductivity $\rho_i$ of smaller than 10 μS/cm when measured by the JIS-standard testing method (JIS K0522).

[Drying Device]

The drying device 14 serves to dry the washed electrode catalyst precursor 41 that has been washed by the washing device 13. The drying device 14 includes a drying step executor 51 for executing a drying step for drying the washed electrode catalyst precursor 41 that has been washed by the washing device 13. As a drying method in the drying step, other than a conventional drying method where a vacuum shelf dryer or the like (not shown) is used to vacuum dry a crushed electrode catalyst precursor put on shelves, there may also be employed a drying method using, for example, RIBOCONE (not shown) and a PV mixer (not shown).

<Electrode Catalyst>

There are no particular restrictions on the structure of the electrode catalyst produced in the present embodiment; it will suffice if the electrode catalyst has a structure where noble metal catalyst particles are supported on an electrically conductive support (e.g. conductive carbon support, conductive metal oxide support). For example, the electrode catalyst may be a so-called Pt catalyst, a so-called Pt alloy catalyst (e.g. PtCo catalyst, PtNi catalyst), and a so-called core-shell catalyst having a core-shell structure.

For example, as for a core-shell catalyst having a composition where palladium is employed as a constituent element for the core part 4, and platinum is employed as a constituent element for the shell part 5, chlorine (Cl) species-containing materials such as chloride salts of platinum (Pt) and chloride salts of palladium (Pd) are used as raw materials in many cases. By means of the electrode catalyst production system and production method of the present embodiment, there can be produced an electrode catalyst having a reduced content of these chlorine (Cl) species.

Figure 11:
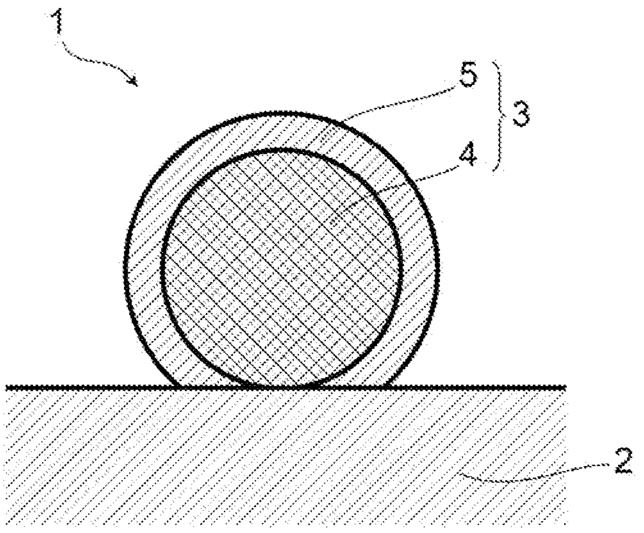
FIG. 11 is a schematic cross-sectional view showing an example of a structure of an electrode catalyst (core-shell catalyst) produced by the electrode catalyst production system and production method of the present invention.

One example of the structure of an electrode catalyst is described in greater detail with reference to the drawings; as shown in FIG. 11, the electrode catalyst 1 having a core-shell structure includes the support 2 and a catalyst particle 3 supported on the support 2. The catalyst particle 3 has the core part 4 and the shell part 5 formed to coat at least part of the core part 4. The catalyst particle 3 has a so-called core-shell structure including the core part 4 and the shell part 5 formed on the core part 4.

That is, the electrode catalyst 1 has the catalyst particle 3 supported on the support 2; this catalyst particle 3 has a structure where the core part 4 serves as a core (core), and the shell part 5 serves as a shell coating the surface of the core part 4. Further, the constituent element (chemical composition) of the core part 4 and the constituent element (chemical composition) of the shell part 5 differ from each other in composition.

Figure 12:
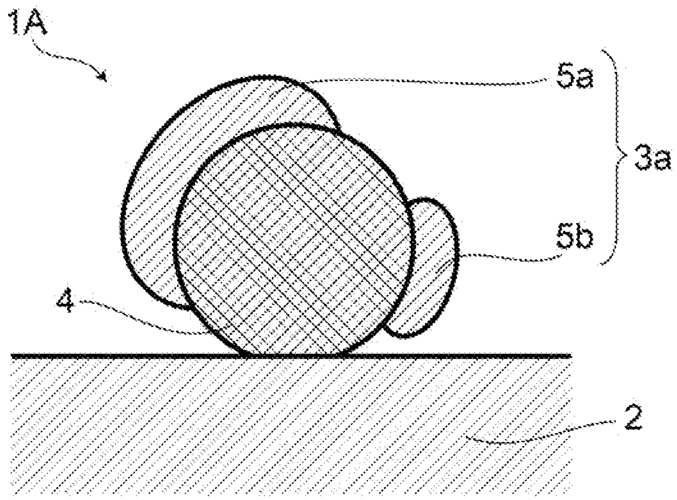
FIG. 12 is a schematic cross-sectional view showing another example of a structure of an electrode catalyst (core-shell catalyst) produced by the electrode catalyst production system and production method of the present invention.
Figure 13:
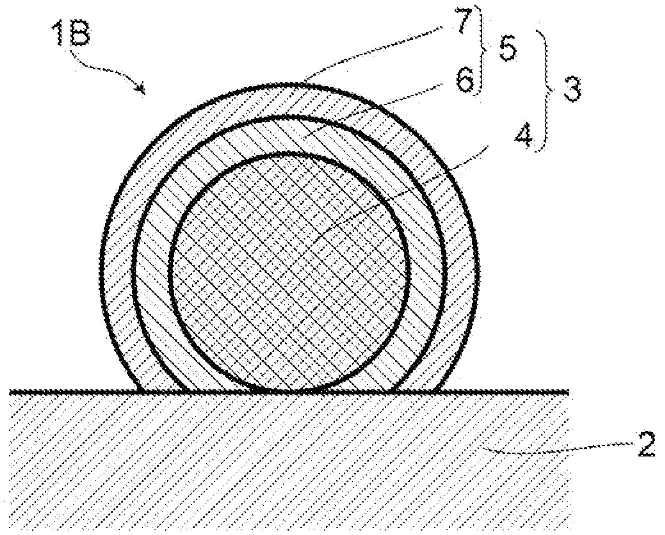
FIG. 13 is a schematic cross-sectional view showing another example of a structure of an electrode catalyst (core-shell catalyst) produced by the electrode catalyst production system and production method of the present invention.
Figure 14:
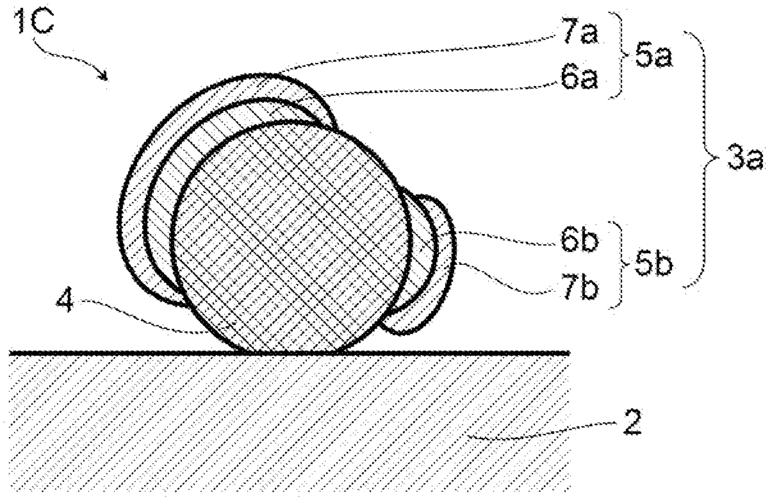
FIG. 14 is a schematic cross-sectional view showing another example of a structure of an electrode catalyst (core-shell catalyst) produced by the electrode catalyst production system and production method of the present invention.

A specific example of a core-shell structure is further shown hereunder; in FIG. 12, an electrode catalyst 1A has a catalyst particle 3*a* comprised of the core part 4, a shell part 5*a* coating one part of the surface of the core part 4, and a shell part 5*b* coating another part of the surface of the core part 4. Further, in FIG. 13, an electrode catalyst 1B has a catalyst particle 3 comprised of the core part 4 and a shell part 5 substantially coating the entire surface of the core part 4, where the shell part 5 has a two-layer structure including a first shell part 6 and a second shell part 7. Furthermore, in FIG. 14, an electrode catalyst 1C has a catalyst particle 3*a* comprised of the core part 4, a shell part 5*a* coating one part of the surface of the core part 4, and a shell part 5*b* coating another part of the surface of the core part 4, where the shell part 5*a* has a two-layer structure including a first shell part 6*a* and a second shell part 7*a*, and where the shell part 5*b* has a two-layer structure including a first shell part 6*b* and a second shell part 7*b*.

In the present embodiment, chlorine (Cl) species refer to chemical species containing chlorine as a constituent component element. Specifically, chlorine-containing chemical species may include chlorine atoms (Cl), chlorine molecules ($Cl_2$), chloride ions ($Cl^-$), chorine radicals (Cl·), polyatomic chlorine ions, and chlorine compounds (e.g. X—Cl where X is a counterion).

In the present embodiment, bromine (Br) species refer to chemical species containing bromine as a constituent component element. Specifically, bromine-containing chemical species may include bromine atoms (Br), bromine molecules (Bra), bromide ions ($Br^-$), bromine radicals (Br·), polyatomic bromine ions, and bromine compounds (e.g. X—Br where X is a counterion).

<Production Method of Electrode Catalyst>

Figure 15:
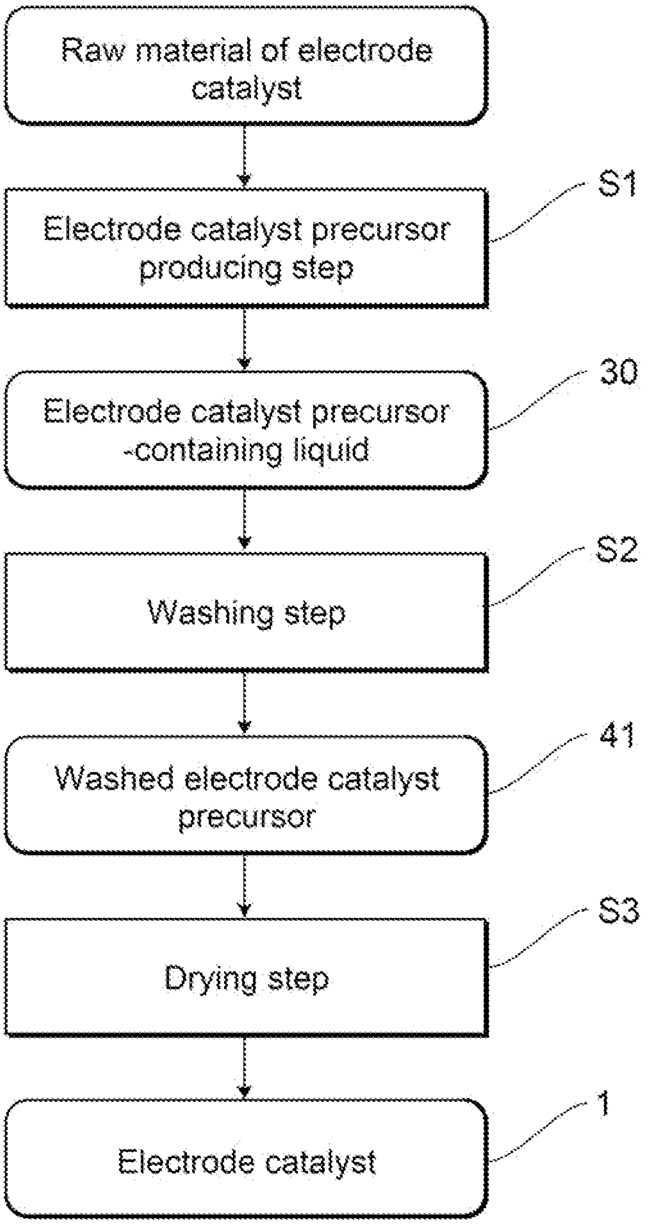
FIG. 15 is a flow chart showing a preferable embodiment of a flow of the electrode catalyst production method of the present invention.

As shown in FIG. 15, the electrode catalyst production method of the present embodiment includes an electrode catalyst precursor producing step S1 for producing an electrode catalyst precursor as a raw material of an electrode catalyst; a washing step S2 for washing, via filter press, the liquid 30 containing the electrode catalyst precursor produced in the electrode catalyst precursor producing step S1; and a drying step S3 for drying the washed electrode catalyst precursor 41 that has been washed in the washing step S2. The steps S1, S2 and S3 can be respectively performed by the electrode catalyst precursor production device 12, washing device 13 and drying device 14 of the electrode catalyst production system 10.

As shown in FIG. 16, the washing step S2 includes the plate closing step S21, the injection step S22, the normal washing step S23, the reverse washing step S24, the plate opening step S25, the cake peeling step S26, and the filter cloth washing step S27. In the washing step S2, by washing, filtrating and dewatering the liquid 30 containing the electrode catalyst precursor produced in the electrode catalyst precursor producing step S1, there can be obtained a washed electrode catalyst precursor 41. Further, the compression step may be performed after the normal washing step S23 and/or after the reverse washing step S24. The configurations of the steps S21 to S27 as well as the compression step are described as above in (Washing device) under <Electrode catalyst production system>.

WORKING EXAMPLES

Working examples listed below are to exemplify the embodiment of the present invention, and shall not be construed as limiting the scope of the present invention.

Production of Electrode Catalyst Precursor (Reaction Step, Electrode Catalyst Precursor Producing Step)

Production Example 1

As a precursor of the electrode catalyst precursor, there was produced a precursor of a Pt particle-supported carbon catalyst (referred to as "Pt/C catalyst" hereunder; produced by N.E. CHEMCAT CORPORATION; Pt carrying rate 50 wt %; product name: "SA50BK").

As a support of this precursor, there was used a commercially available conductive hollow carbon support {produced by Lion Corporation; product name "CARBON ECP" (registered trademark) (Ketjenblack EC300J); specific surface area 750 to 800 $m^2/g$}. By adding a water-soluble reductant to a water containing this support and a water-soluble Pt salt, and then allowing a reduction reaction of the Pt component to progress at a given temperature, the electrode catalyst precursor used in the present embodiment was prepared.

[Preparation of Electrode Catalyst Precursor-Containing Liquid (Stock Liquid)]

The liquid containing the electrode catalyst precursor obtained as above was dispersed in a kettle without being dried, and was used as a stock liquid to be treated by the washing device.

Production of Electrode Catalyst

Working Example 1

[Treatment by Washing Device (Washing Step)]

The liquid containing the electrode catalyst precursor obtained in the production example 1 was introduced into the washing device so as to perform the washing treatment. Table 1 shows a treatment time(s) of each step with regard to the washing device. At first, the injection step was performed for 20 min. The thickness of the electrode catalyst precursor-containing cake in the injection step was set to 5 to 10 mm.

Such thickness of the cake is within a thickness range previously determined by a preliminary experiment in view of the washing degree and washing time that are required for the electrode catalyst precursor used.

Next, the normal washing step was performed. In the normal washing step, treatment was at first performed with a washing water of a normal temperature (23° C.) for 24 min; the washing water was then switched to a heated water (70° C.) at the moment when the electric conductivity p of the filtrate had reached 40 μS/cm or lower; and treatment was then performed with such heated water for another 50 min. After the normal washing step, the compression step was performed for 5 min. Next, the reverse washing step was performed; in the reverse washing step, treatment was performed with a heated washing water (70° C.) for 73 min. The washing treatment was performed for about 2.9 hours in total.

An ion-exchange water was used as the washing water. The ion-exchange water used exhibited an electric conductivity $\rho_i$ of 7.70 μS/cm when at a normal temperature (23° C.), and an electric conductivity $\rho_i$ of 4.6 μS/cm when heated (70° C.).

[Treatment by Drying Device (Drying Step)]

The electrode catalyst precursor-containing cake obtained after the treatment by the washing device was then treated with the drying device at a temperature of 70° C. in the air for 24 hours so as to be dried, thereby obtaining the electrode catalyst.

Comparative Example 1

[Treatment by Washing Device (Washing Step)]

The liquid containing the electrode catalyst precursor obtained in the production example 1 was introduced into the washing device so as to perform the washing treatment. Table 1 shows a treatment time(s) of each step with regard to the washing device. At first, the injection step was performed for 40 min. The thickness of the electrode catalyst precursor-containing cake in the injection step was set to 11 to 15 mm.

Such thickness of the cake is out of a thickness range previously determined by a preliminary experiment in view of the washing degree and washing time that are required for the electrode catalyst precursor used.

Next, the normal washing step was performed. In the normal washing step, treatment was at first performed with a washing water of a normal temperature (23° C.) for 33 min; the washing water was then switched to a heated water (70° C.) at the moment when the electric conductivity p of the filtrate had reached 40 μS/cm or lower; and treatment was then performed with such heated water for another 60 min. After the normal washing step, the compression step was performed for 5 min, and the reverse washing step was performed subsequently. However, since the conductivity p of the filtrate did not change from the electric conductivity ρ of the filtrate that was observed at the time when the normal washing step was finished, the treatment was then stopped after performing the reverse washing step for 36 min i.e. after performing the washing treatment for about 2.9 hours in total.

An ion-exchange water was used as the washing water. The ion-exchange water used exhibited an electric conductivity $\rho_i$ of 7.70 μS/cm when at a normal temperature (23° C.), and an electric conductivity $\rho_i$ of 4.6 μS/cm when heated (70° C.).

[Treatment by Drying Device (Drying Step)]

The electrode catalyst precursor-containing cake obtained after the treatment by the washing device was then treated with the drying device at a temperature of 70° C. in the air for 24 hours so as to be dried, thereby obtaining the electrode catalyst.

TABLE 1

| | | Normal washing step | | | | Reverse washing step | | | | |
|---|---|---|---|---|---|---|---|---|---|---|
| | Injection step | Normal temperature water (23° C.) | Heated water (70° C.) | Electric conductivity of filtrate (μS/cm) | Compression step | Normal temperature water (23° C.) | Heated water (70° C.) | Electric conductivity of filtrate (μS/cm) | Total washing time | Thickness of cake (mm) |
| Working example 1 | 20 min | 24 min | 50 min | 15.9 | 5 min | — | 73 min | 9.7 | 2.9 hours | 5 to 10 |
| Comparative example 1 | 40 min | 33 min | 60 min | 19.3 | 5 min | — | Stopped after 36 min | 19.3 | Stopped after 2.9 hours | 11 to 15 |

Comparative Example 2

The liquid containing the electrode catalyst precursor obtained in the production example 1 was introduced into a centrifugal separator so as to be subjected to a washing treatment. Washing was repeated until the electric conductivity ρ of the filtrate had reached 10 μS/cm or lower when measured by JIS-standard testing method (JIS K0522). A dispersion liquid was then prepared by dispersing the electrode catalyst precursor obtained into an ultrapure water, followed by filtrating such dispersion liquid. The residue obtained by filtration was then treated with the drying device at a temperature of 70° C. in the air for 24 hours so as to be dried, thereby obtaining the electrode catalyst.

<Evaluation Results>

As shown in Table 1, in the working example 1, while the electric conductivity ρ of the filtrate at the time when the normal washing step was finished was 15.9 μS/cm, the electric conductivity ρ of the filtrate at the time when the reverse washing step was finished had dropped to 9.7 μS/cm. The electric conductivity ρ of the filtrate was able to be reduced to 10 μS/cm or lower in a washing treatment time of less than 3 hours. In contrast, in the comparative example 1, while the electric conductivity ρ of the filtrate at the time when the normal washing step was finished had dropped to 19.3 μS/cm, the conductivity did not decrease at all from 19.3 μS/cm thereafter even by performing the reverse washing step. Further, in the comparative example 2 where a centrifugal separator was used to perform washing as is the conventional case, 15 to 19 hours were required in order for the electric conductivity ρ of the filtrate to be reduced to 10 μS/cm or lower, as a result of conducting the comparative example three times. Table 2 shows and compares the treatment times in the working example 1 and the comparative example 2. In Table 2, there are separately shown a treatment time from raw material feed to solid-liquid separation; and a time required for cake washing and dewatering.

TABLE 2

| | Raw material feed to solid-liquid separation | Cake washing, dewatering | Total |
|---|---|---|---|
| Working example 1 | 0.33 hours | 2.9 hours | 3.3 hours |
| Comparative example 2 | About 1 hour | 15 to 19 hours | 16 to 20 hours |

Thus, in the case of the electrode catalyst production system and production method of the present embodiment, the time required for the treatment (washing step) by the washing device can be drastically reduced to ⅕ or shorter as compared to the conventional treatment using a centrifugal separator. Further, as for the washing device of the present embodiment, since the electrode catalyst precursor-containing cake is to be automatically peeled, there can be omitted the operation for an operator to scratch off the electrode catalyst precursor, thereby making it possible to also drastically save effort.

The present invention has so far been described with reference to the embodiment and working example thereof; the invention may be variously modified before exploitation. Especially, there are no particular restrictions on the electrode catalyst precursor production device 12 (reaction step, electrode catalyst precursor producing step S1) and the drying device 14 (drying step S3), and various modified examples may be employed. Further, even in the case of the washing device 13, the structure thereof shall not be limited to that shown in FIG. 2, and the structure of the filter chamber 112 shall not be limited to those shown in FIGS. 3 to 10 either; various modified examples may be employed so long as the structure(s) is capable of bringing about functions and effects that are similar to those in the steps S21 to S27 of the washing step S2 of the present embodiment and in the compression step of the embodiment.

DESCRIPTION OF SYMBOLS

1 Electrode catalyst
2 Support
3 Catalyst particle
4 Core part
5 Shell part
10 Electrode catalyst production system
12 Electrode catalyst precursor production device
13 Washing device
14 Drying device
30 Electrode catalyst precursor-containing liquid (stock liquid)
40 Electrode catalyst precursor-containing cake
41 Washed electrode catalyst precursor
42 Filtrate
43 Washing water
111, 111' Filter plate
112 Filter chamber
113 Filter cloth
114 Stock liquid supply tube
115, 115' Filtrate discharge outlet
116 Filter bed
T Thickness of electrode catalyst precursor-containing cake
S1 Electrode catalyst precursor producing step
S2 Washing step
S3 Drying step
S21 Plate closing step
S22 Injection step
S23 Normal washing step
S24 Reverse washing step
S25 Plate opening step
S26 Cake peeling step
S27 Filter cloth washing step
ρ Electric conductivity of filtrate
$\rho_i$ Electric conductivity of ion-exchange water

INDUSTRIAL APPLICABILITY

In the case of the electrode catalyst production system and production method of the present invention, the operation for an operator to scratch off the electrode catalyst precursor can be omitted, and the washing time of the electrode catalyst precursor can be shortened, thus making it possible to drastically reduce the time and effort for producing an electrode catalyst having a low halogen content, particularly a low chlorine content.

Thus, the present invention relates to an electrode catalyst production system and production method that are applicable not only to the electric equipment industry manufacturing fuel cells, fuel-cell automobiles, mobile phones and the like, but also to ene-farms, cogeneration systems and the like; the invention contributes to developments related to the energy industry and environmental technologies.

We claim:

1. An electrode catalyst production system for producing an electrode catalyst, comprising:

an electrode catalyst precursor production device for producing an electrode catalyst precursor as a raw material of an electrode catalyst containing an electrically conductive support and a catalyst particle supported on the electrically conductive support;

a washing device for washing the electrode catalyst precursor by filter press; and a drying device for drying the washed electrode catalyst precursor that has been washed by the washing device, wherein the washing device is configured to execute:

a plate closing step for forming a filter chamber by clamping together filter plates;

an injection step for injecting a liquid containing the electrode catalyst precursor into the filter chamber from a stock liquid supply tube so as to filtrate the liquid, and then discharging a filtrate from filtrate discharge outlets;

a normal washing step for supplying a first washing water from the stock liquid supply tube to the filter chamber, allowing the first washing water to pass through a cake containing the electrode catalyst precursor, and then discharging the washing water from the filtrate discharge outlets;

a reverse washing step for supplying a second washing water from one or more of the filtrate discharge outlets to the filter chamber, allowing the second washing water to pass through the cake containing the electrode catalyst precursor, and then discharging the second washing water from one or more of the filtrate discharge outlets which are different from the filtrate discharge outlet(s) from which the second washing water is supplied;

a plate opening step for opening the filter plates forming the filter chamber; and a cake peeling step for bringing down a filter cloth so as to peel and drop the cake containing the electrode catalyst precursor, and wherein in the injection step, the cake is formed in such a manner that a thickness thereof falls into a range that has been previously and experimentally determined in consideration of a washing degree and a washing time that are required for the electrode catalyst precursor used.

2. The electrode catalyst production system according to claim 1, wherein when the electrically conductive support is a conductive carbon, the thickness of the cake containing the electrode catalyst precursor is 5 to 10 mm at the time of the injection step.

3. The electrode catalyst production system according to claim 1, wherein the washing device is further configured to execute a filter cloth washing step for washing the filter cloth with a third washing water after the cake peeling step.

4. The electrode catalyst production system according to claim 1, wherein a first washing time in the reverse washing step and a second washing time in the normal washing step are of similar length.

5. The electrode catalyst production system according to claim 1, wherein the cake peeled and dropped in the cake peeling step has a water content ratio of 60 to 80 wt %.

6. The electrode catalyst production system according to claim 2, wherein the washing device is further configured to execute a filter cloth washing step for washing the filter cloth with a third washing water after the cake peeling step.

7. The electrode catalyst production system according to claim 2, wherein a first washing time in the reverse washing step and a second washing time in the normal washing step are of similar length.

8. The electrode catalyst production system according to claim 3, wherein a first washing time in the reverse washing step and a second washing time in the normal washing step are of similar length.

9. The electrode catalyst production system according to claim 2, wherein the cake peeled and dropped in the cake peeling step has a water content ratio of 60 to 80 wt %.

10. The electrode catalyst production system according to claim 3, wherein the cake peeled and dropped in the cake peeling step has a water content ratio of 60 to 80 wt %.

* * * * *